United States Patent [19]

Miyazawa

[11] 4,340,823

[45] Jul. 20, 1982

[54] UNINTERRUPTIBLE POWER SUPPLY

[75] Inventor: Yoshiaki Miyazawa, Kunitachi, Japan

[73] Assignee: Tokyo Shibaura Denki Kabushiki Kaisha, Kawasaki, Japan

[21] Appl. No.: 258,927

[22] Filed: Apr. 30, 1981

[30] Foreign Application Priority Data

May 7, 1980 [JP] Japan .................................. 55/60189

[51] Int. Cl.³ ............................. H02J 7/02; H02J 9/04
[52] U.S. Cl. ......................................... 307/66; 307/77; 320/56; 320/59
[58] Field of Search ...................... 307/66, 46, 48, 77; 320/57, 59, 5, 15, 56

[56] References Cited

U.S. PATENT DOCUMENTS 3,694,731 9/1972 Cherry .............................. 320/59 X

OTHER PUBLICATIONS

SCR Handbook Chapter 8, Sec. 1 "(ii) Booster Connection"; J. Yamada; Oct. 30, 1966, (FIG. 8.4 and FIG. 8.5, pp. 168–169).

Primary Examiner—Michael L. Gellner
Attorney, Agent, or Firm—Oblon, Fisher, Spivak, McClelland & Maier

[57] ABSTRACT

An uninterruptible power supply including a rectifier for receiving a first AC power signal and converting the first AC power signal into a first DC power signal to produce a DC power output of the uninterruptible power supply, a battery for supplying a second DC power signal, a controlled rectifier for receiving a second AC power signal and converting the second AC power signal into a controlled power output, and a switch connected to receive the second DC power signal from the battery for producing the second DC power signal as the DC power output power when the first AC power signal is interrupted. Output terminals of the rectifier are connected in series with output terminals of the controlled rectifier and the battery, whereby the first DC power signal and the controlled power output are added and applied to the battery for charging thereof.

12 Claims, 4 Drawing Figures

UNINTERRUPTIBLE POWER SUPPLY

BACKGROUND OF THE INVENTION

1. Field of the Invention

This invention relates to an uninterruptible power supply with a battery.

2. Description of the Prior Art

FIG. 1 is a block diagram showing one example of a conventional uninterruptible power supply.

In FIG. 1, the reference numeral 50A designates an uninterruptible power supply which includes a commercial power source 1, a transformer 2 for a rectifier 3, the rectifier 3 having diodes, a smoothing inductor 4, a smoothing-capacitor 5, and an inverter 6. There are also provided an AC filtering-inductor 7 and an AC filtering-capacitor 8 for improving the waveform of the AC output of the inverter 6.

The uninterruptible power supply 50A also includes a battery 9 and a charging circuit 60A which includes a commercial power source 10, a transformer 11 for a charger 12, the charger 12 having thyristors and a smoothing inductor 13. There is further provided a thyristor switch 14 connected to the battery 9 for supplying DC power to the inverter 6 when the commercial power source 1 fails. However in the conventional uninterruptible power supply 50A shown in FIG. 1, it is necessary to provide the charge circuit 60A exclusively. Therefore while the uninterruptible power supply 50A shown in FIG. 1 is suitable for a large capacity type uninterruptible power supply, it is not suitable for use as small capacity type from an economical standpoint.

A conventional small capacity type uninterruptible power supply, commonly known as a "battery floating system" has been widely used, an example of which is shown in FIG. 2. In FIG. 2, like reference numerals designate identical or corresponding parts as those shown in FIG. 1. In FIG. 2, the reference numeral 50B designates an uninterruptible power supply, numeral 21 designates a transformer for a rectifier 22 which includes thyristors and simultaneously operates as a rectifier and a charger for the battery 9, numeral 23 designates a smoothing-inductor and numeral 24 designates a smoothing-capacitor. The rectifier 22 is controlled by changing the phase control angle a of the thyristors thereof by a control circuit (not shown) for either constant voltage control or constant current control of the output of the rectifier 22. Therefore the rectifier 22 provides a function of constant voltage charging or constant current charging of the battery 9 according to the charging status of the battery 9.

As described above, in the uninterruptible power supply 50B shown in FIG. 2, it is not necessary to provide an exclusive charge circuit such as the charge circuit 60A shown in FIG. 1. Thus, the uninterruptible power supply 50B has the advantage that the number of elements required for constructing the uninterruptible power supply is smaller than that of the uninterruptible power supply 50A shown in FIG. 1.

Also, it is noted that a battery is generally to be charged with a so-called equalizing charge voltage which is higher than the usual charge voltage (a floating charge voltage) by 10-15% thereof at regular intervals of a few months. Therefore it is necessary to design the transformer 21 and the rectifier 22 of the uninterruptible power supply 50B to be able to generate the equalizing charge voltage. When the rectifier 22 is required to generate the equalizing charge voltage, the phase control angle α of the thyristors of the rectifier 22 is to be controlled to a small value or zero.

On the contrary when the rectifier 22 is required to generate the floating charge voltage in an ordinary operation time of the uninterruptible power supply 50B, the phase control angle α of the thyristors of the rectifier 22 is to be controlled to a considerably large value. As a result of this, the input power factor in ordinary operation of the uninterruptible power supply 50B is reduced considerably, so the capacity of the transformer 21 and the input power capacity of the transformer 21 necessary for generating the floating charge voltage must be designed to be larger values than those of the transformer 2 shown in FIG. 1.

Furthermore the output ripple voltage of the rectifier 22 becomes larger, so both the smoothing-inductor 23 and the smoothing-capacitor 24 are to be provided with larger capacities.

As described above though the uninterruptible power supply 50B shown in FIG. 2 has the merit that the number of construction elements is small, it is not necessarily certain that this uninterruptible power supply 50B is superior from an economical standpoint. Therefore, this uninterruptible power supply has found limited use.

SUMMARY OF THE INVENTION

Accordingly, one object of this invention is to provide a novel uninterruptible power supply having a simple and economical construction.

Another object of this invention is to provide an uninterruptible power supply having superior electrical characteristics.

Still another object of this invention is to provide an uninterruptible power supply which can cover a wide range of uses from a small capacity use to a large capacity use.

These and other objects of this invention are achieved by providing an uninterruptible power supply including a rectifier for receiving a first AC power signal and converting the first AC power signal into a first DC power signal to produce a DC power output of the uninterruptible power supply, a battery for supplying a second DC power signal, a controlled rectifier for receiving a second AC power signal and converting the second AC power signal into a controlled power output and a switch connected to receive the second DC power signal from the battery for producing the second DC power signal as the DC power output when the first AC power signal is interrupted. In the uninterruptible power supply, output terminals of the rectifier are connected in series with output terminals of the controlled rectifier and the battery, whereby the first DC power signal and the controlled power output are added and applied to the battery for charging thereof.

In a preferred embodiment, the uninterruptible power supply further includes an inverter connected to receive the DC power output for converting the DC power output into a third AC power signal to produce an AC power output of the uninterruptible power supply.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein.

DESCRIPTION OF THE PREFERRED EMBODIMENTS

Figure 3:
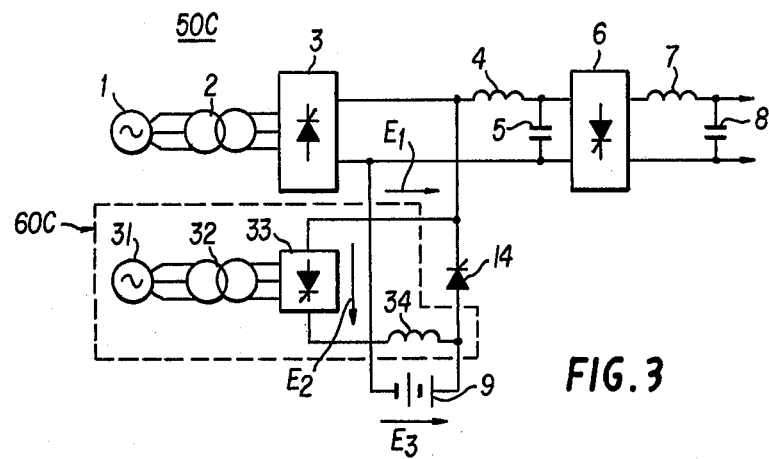
FIG. 3 is a block diagram showing an uninterruptible power supply according to a preferred embodiment of this invention.

Referring to the drawings, wherein like reference numerals designate identical or corresponding parts throughout the several views, and more particularly to FIG. 3 thereof, an uninterruptible power supply 50C according to a preferred embodiment of this invention is shown. In FIG. 3, the rectifier 3 receives a first AC power from the commercial power source 1 through the transformer 2 and converts the first AC power into a first DC power having a DC voltage E1. There is also provided a charge circuit 60C which includes a commercial power source 31 for supplying a second AC power, a transformer 32, a controlled rectifier 33 for charging the battery 9 and a smoothing inductor 34.

Figure 4:
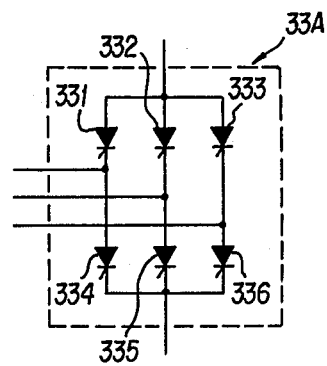
FIG. 4 is a circuit diagram showing one example of a circuit construction of the controlled rectifiers for charging shown in FIG. 3.

One example of a circuit construction of the controlled rectifier 33 is a three phase thyristor bridge rectifier 33A shown in FIG. 4.

In FIG. 4, 331–336 are thyristors and a circuit construction of the three phase thyristor bridge rectifier 33A is clear in FIG. 4 and is also well known to those skilled in the art. Therefore, the detailed description of the three phase thyristor bridge rectifier 33A is omitted. The three phase thyristor bridge rectifier 33A can be operated as a line commutated inverter, therefore its operation can range from converter operation to inverter operation by changing the phase control angle α of the thyristors 331–336. As described above, the controlled rectifier 33 receives a second AC power signal from the commercial power source 31 through the transformer 32 and converts the second AC power signal into a controlled power output having a DC voltage E2. Output terminals of the rectifier 3 are connected in series with output terminals of the controlled rectifier 33, and this series connected circuit is connected to the battery 9 through the smoothing inductors 34 for charging the battery 9 which produces a second DC power signal. Usually the DC output of the rectifier 3 is applied to the inverter 6 after being smoothed by a smoothing circuit including the smoothing-inductor 4 and the smoothing-capacitor 5 and then converted into a third AC power signal to produce an AC power output of the uninterruptible power supply 50C. But when the commercial power source 1 fails, the thyristor switch 14 is operated to supply the second DC power signal of the battery 9 as the DC power output to the inverter 6 by a control circuit (not shown) which detects the interruption and controls the phase control angle of the thyristor of the thyristor switch 14.

Hereinafter the operation of the uninterruptible power supply 50C will be described in detail. The output voltage E2 of the controlled recifier 33 is added to or subtracted from the output voltage E1 of the rectifier 3, and the resultant voltage is applied to the battery 9 for charging.

When the uninterruptible power supply 50C is in its ordinary operation, the battery 9 is to be charged with a floating charge voltage. When the output voltage E1 of the rectifier 3 is smaller than the terminal voltage E3 of the battery 9 in this operation time, the controlled rectifier 33 is operated in its converter operating region by controlling the phase control angle α of the thyristors of the controlled rectifier 33 to a value smaller than 90°. As a result of this the output voltage E2 of the controlled rectifier 33 becomes a positive value. The output voltage E1 of the rectifier 3 and the positive output voltage E2 of the controlled rectifier 33 are added and then applied to the battery 9 for charging. But when the output voltage E1 of the rectifier 3 is larger than the terminal voltage E3 of the battery 9 in this operation time, the controlled rectifier 33 is operated in its inverter operating region by controlling the phase control angle α of the thyristors of the controlled rectifier 33 to a value larger than 90°. As a result of this the output voltage E2 of the controlled rectifier 33 becomes a negative value. The output voltage E1 of the rectifier 3 and the output voltage E2 of the controlled rectifier 33 which is negative are added and then applied to the battery 9 for charging.

In these operating conditions, the controlled rectifier 33 is controlled by a control circuit (not shown) for supplying constant voltage to the battery 9 for constant voltage charging.

On the other hand, in case of initial charging, charging after discharging to the final charge or charging immediately after being switched from floating charge operation to equalizing charge operation, in order to avoid overcharging of the battery 9, constant current charging is required. First when the output voltage E1 of the rectifier 3 is smaller than the terminal voltage E3 of the battery 9, the controlled rectifier 33 is operated in its converter operating region. Then the output voltage E1 of the rectifier 3 and the positive output voltage E2 of the controlled rectifier 33 are added and then applied to the battery 9 for charging in the same way as described above. But in this case the controlled rectifier 33 is controlled by a control circuit (not shown) for supplying constant current to the battery 9 for constant current charging. Secondly, when the output voltage E1 of the rectifier 3 is larger than the terminal voltage E3 of the battery 9, the controlled rectifier 33 is to be operated in its inverter operating region by controlling the phase control angle α of the thyristors of the controlled rectifier 33 to a value larger than 90°. As a result of this the output voltage E2 of the controlled rectifier 33 becomes a negative value. The output voltage E1 of the rectifier 3 and the negative output voltage E2 of the controlled rectifier 33 are added, namely the absolute value of the negative output voltage E2 is subtracted from the output voltage E1, then applied to the battery 9 for charging. In this case the battery is also charged with a constant current.

Figure 1:
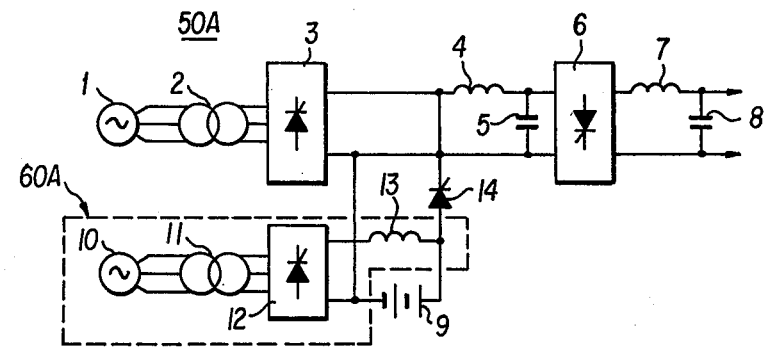
FIG. 1 is a block diagram showing a first conventional uninterruptible power supply.
Figure 2:
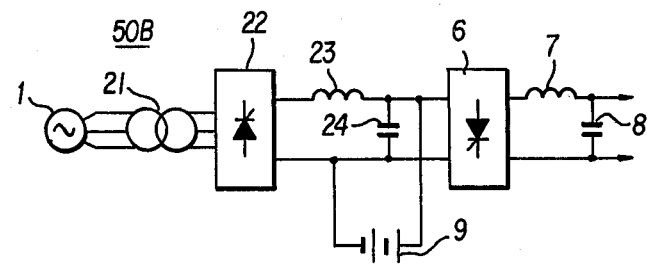
FIG. 2 is a block diagram showing another conventional uninterruptible power supply.

Nextly, the capacity of the charge circuit 60C will be described. The changing range of the output voltage E1 of the rectifier 3 is within ±10% corresponding to that of the commercial power source 1. The changing range of the terminal voltage E3 of the battery 9 is within ±20%, even if the changing range from a discharged final voltage to an equalizing charge voltage is taken into consideration. Therefore it becomes possible to control the charging of the battery 9 with a constant voltage or a constant current by determining the range for controlling the output voltage E2 of the controlled rectifier 33 to within approximately ±30%. Accordingly the capacities of the elements of the charge circuit 60C in FIG. 3 can be reduced to approximately 30% of those of the charge circuit 60A in FIG. 1. As the inductance of the smoothing inductor 34 can be determined to be a small value, it may be omitted by increasing the leakage reactance of the transformer 32 by a small amount.

This invention is not restricted to the uninterruptible power supply 50C shown in FIG. 3. For example, the output terminals of the controlled rectifier 33 are connected directly in series with the output terminals of the rectifier 3 in FIG. 3, but they may be connected in series with the output of smoothing-capacitor 5 which is the smoothed output of the rectifier 3. The controlled rectifier 33 is not restricted to the three phase thyristor bridge rectifier 33A shown in FIG. 4. A circuit which can operate as a line commutated inverter, for example a single phase thyristor bridge rectifier, can be used as the controlled rectifier 33.

Moreover the commercial power source 31 may be neglected. In this case the transformer 32 is connected directly to the commercial power source 1, and the second AC power is supplied from the commercial power source 1 to the controlled rectifier 33 through the transformer 32.

Moreover this invention may be applied to an uninterruptible power supply without an inverter, wherein AC power is applied and converted into DC power which is applied to the outer device as the DC power output of the uninterruptible power supply.

As described above, this invention is constructed as follows: the output voltage of the controlled rectifier including a thyristor which operates as a line commutated inverter is added to or substracted from the output voltage of the rectifier including a diode, and the resultant voltage is applied to the battery for charging. According to this invention, an uninterruptible power supply with a simple and economical construction can be provided. This invention can also provide an uninterruptible power supply which is superior in its electrical characteristics because the problem of the reduction of the input power factor is solved.

This invention can further provide an uninterruptible power supply which can cover a wide range from a small capacity use to a large capacity use.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An uninterruptible power supply comprising:
   rectifier means having input and output terminals for receiving at said input terminals a first AC power signal and converting said first AC power signal into a first DC power signal to produce at said output terminals a DC power output of said uninterruptible power supply;
   battery means for supplying a second DC power signal;
   controlled rectifier means having input and output terminals for receiving at the input terminals thereof a second AC power signal and converting said second AC power signal into a controlled power output provided at the output terminals thereof;
   switch means connected to receive said second DC power signal from said battery for producing said second DC power signal as said DC power output when said first AC power signal is interrupted; and
   the output terminals of said rectifier means being connected in series with the output terminals of said controlled rectifier means and said battery means, whereby said first DC power signal and said controlled power output are added and applied to said battery means for charging thereof.

2. The uninterruptible power supply according to claim 1, wherein said rectifier means comprises:
   a diode for converting said first AC power signal into said first DC power signal.

3. The uninterruptible power supply according to claim 1, wherein said controlled rectifier means comprises:
   a line commutated inverter means including a thyristor characterized by an operating range variable from converter operating to inverter operating by changing a phase control angle of said thyristor.

4. The uninterruptible power supply according to claim 3, wherein said line commutated inverter means comprises:
   a three phase thyristor bridge rectifier.

5. The uninterruptible power supply according to claim 3, wherein said line commutated inverter means comprises:
   a single phase thyristor bridge rectifier.

6. The uninterruptible power supply according to claim 1, wherein said switch means comprises:
   a thyristor switch.

7. The uninterruptible power supply according to claim 1, further comprising:
   smoothing means connected to receive said first DC power signal for smoothing said first DC power signal to produce said DC power output.

8. The uninterruptible power supply according to claim 7 wherein said smoothing means comprises:
   a smoothing inductor, and a smoothing capacitor connected in series with said smoothing inductor.

9. The uninterruptible power supply according to claim 8, wherein:
   the terminals of said smoothing capacitor are connected in series with said output terminals of the controlled rectifier means and said battery means.

10. The uninterruptible power supply according to claim 1, further comprising:
    inverter means connected to receive said DC power output for converting said DC power output into a third AC power signal to produce an AC power output of said uninterruptible power supply.

11. The uninterruptible power supply according to claims 2, 3, or 6, further comprising:
    inverter means connected to receive said DC power output for converting said DC power output into a third AC power signal to produce an AC power output of said uninterruptible power supply.

12. The uninterruptible power supply according to claim 10, wherein:
    said rectifier means comprises a diode for converting said first AC power signal into said first DC power signal;
    said controlled rectifier means comprises a three phase thyristor bridge rectifier; and
    said switch means comprises a thyristor bridge.

* * * * *